US012515594B2

(12) United States Patent
Syldatke

(10) Patent No.: US 12,515,594 B2
(45) Date of Patent: Jan. 6, 2026

(54) DEVICE FOR RECEIVING A DISPLAY CONTROL DEVICE

(71) Applicant: Volkswagen Aktiengesellschaft, Wolfsburg (DE)

(72) Inventor: Ralf Syldatke, Dortmund (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 798 days.

(21) Appl. No.: 17/599,929

(22) PCT Filed: Mar. 11, 2020

(86) PCT No.: PCT/EP2020/056571
§ 371 (c)(1),
(2) Date: Sep. 29, 2021

(87) PCT Pub. No.: WO2020/200680
PCT Pub. Date: Oct. 8, 2020

(65) Prior Publication Data
US 2022/0185199 A1 Jun. 16, 2022

(30) Foreign Application Priority Data
Apr. 2, 2019 (DE) ...................... 10 2019 204 697.5

(51) Int. Cl.
*A47B 88/00* (2017.01)
*B60K 35/50* (2024.01)
(Continued)

(52) U.S. Cl.
CPC .......... *B60R 11/0235* (2013.01); *B60K 35/50* (2024.01); *A47B 88/00* (2013.01);
(Continued)

(58) Field of Classification Search
CPC ............ A47B 88/00; A47B 2210/0051; A47B 2210/0054
(Continued)

(56) References Cited

U.S. PATENT DOCUMENTS 5,277,958 A * 1/1994 Tomkins .................. E04C 2/365
428/116
6,400,561 B1 * 6/2002 Horton ................ B60R 11/0252
248/185.1
(Continued)

FOREIGN PATENT DOCUMENTS

CN 106672010 A 5/2017
CN 206984134 U 2/2018
(Continued)

OTHER PUBLICATIONS

PCT/EP2020/056571. International Search Report (Jun. 29, 2020).
(Continued)

*Primary Examiner* — Alfred J Wujciak
(74) *Attorney, Agent, or Firm* — Peter Zura; LOZA & LOZA, LLP

(57) ABSTRACT

A device for receiving a display/operating panel and positioning the display/operating panel in a vehicle structure. The device may include at least one guide, that can bear on a corresponding receiver in the vehicle structure, characterized in that the guide includes both guide elements as well as deformation elements.

20 Claims, 5 Drawing Sheets

(51) Int. Cl.
*B60R 11/02* (2006.01)
*B60K 35/10* (2024.01)
*B60K 35/22* (2024.01)
*B60R 11/00* (2006.01)
*B60R 21/055* (2006.01)

(52) U.S. Cl.
CPC ............... *A47B 2210/0051* (2013.01); *A47B 2210/0054* (2013.01); *B60K 35/10* (2024.01); *B60K 35/22* (2024.01); *B60K 2360/1438* (2024.01); *B60K 2360/652* (2024.01); *B60K 2360/816* (2024.01); *B60R 2011/0003* (2013.01); *B60R 2011/0084* (2013.01); *B60R 21/055* (2013.01)

(58) Field of Classification Search
USPC ............... 248/27.1, 27.3, 298.1, 424, 429; 312/330.1, 334.5
See application file for complete search history.

(56) References Cited

U.S. PATENT DOCUMENTS

| | | | | |
|---|---|---|---|---|
| 7,780,254 | B2* | 8/2010 | Wang | A47B 88/483 |
| | | | | 312/334.44 |
| 8,696,078 | B2* | 4/2014 | Gasser | A47B 88/57 |
| | | | | 312/348.2 |
| 8,931,860 | B2* | 1/2015 | Fan | H05K 7/1489 |
| | | | | 312/334.44 |
| 9,487,157 | B1 | 11/2016 | Vinton | |
| 10,442,325 | B2* | 10/2019 | Wang | B60N 2/4228 |
| 2006/0119180 | A1 | 6/2006 | Chao | |
| 2013/0038098 | A1* | 2/2013 | Maier | B60N 2/1615 |
| | | | | 297/216.1 |
| 2015/0034774 | A1 | 2/2015 | Perveyrie et al. | |

FOREIGN PATENT DOCUMENTS

| | | |
|---|---|---|
| CN | 108909665 A | 11/2018 |
| DE | 4001448 C1 | 7/1991 |
| DE | 10233510 B3 | 1/2004 |
| DE | 102014001862 A1 | 8/2015 |
| DE | 112013005551 T5 | 8/2015 |
| DE | 102016111614 A1 | 1/2017 |
| DE | 102016200902 A1 | 7/2017 |
| DE | 102016224500 B3 | 4/2018 |
| DE | 102016221434 A1 | 5/2018 |
| EP | 3045340 A1 | 7/2016 |

OTHER PUBLICATIONS

Corresponding Chinese Application No. 202080023591.8. Office Action (Mar. 5, 2024).
Corresponding Chinese Application No. 202080023591.8. Office Action (Oct. 16, 2024).

* cited by examiner

DEVICE FOR RECEIVING A DISPLAY CONTROL DEVICE

CROSS REFERENCE TO RELATED APPLICATION

The present application claims priority to International Patent Application PCT/EP2020/056571 to Ralf Syldatke, filed Mar. 11, 2020, titled "Device for Receiving a Display Control Device", which claims priority to German Patent Application No. DE 10 2019 204 697.5, to Ralf Syldatke, filed Apr. 2, 2019, the contents of each being incorporated by reference in their entirety herein.

FIELD OF TECHNOLOGY

The present disclosure relates to devices for receiving a display/operating panel and for positioning the display/operating panel on a vehicle structure.

BACKGROUND

Devices, such as display devices, typically have a receiving section for a display/operating panel formed by a display screen, for example. The display screen is used to display information and/or output media content. Operating elements can also be integrated therein, for example, through a touch-sensitive screen.

In order to be able to place display/operating panels in a motor vehicle, the device has a guide that can be placed in corresponding receivers, such as a rail system. These have sliding elements that are placed in the rails. The sliding elements are connected to the device, such that the entire device, including the display/operating panel is positioned in the motor vehicle.

Because the display/operating panel is placed in a readily accessed area, such as the interior of a motor vehicle, it may be subjected to different loads. It can therefore be loaded along the z-axis (vertically) when pressure is applied unintentionally to the display/operating panel. The force involved in this must then be absorbed by the sliding elements, and conducted into the rail system. Because the sliding elements are relatively close together, the rail system is subjected to a relatively heavy load, in particular also because the sliding elements are at a distance to the display/operating panel, such that relatively strong forces must be absorbed by a lever arm therein.

Furthermore, forces may act along the x-axis (longitudinally). To minimize the risk of injury to the occupants of the vehicle, there are spring elements that support the device within the vehicle structure that absorb the forces caused by loads along this x-axis, e.g., in the manner of a headrest. The spring elements must be individually positioned, and are designed in terms of their spring capacity such that maximum values for accelerations and forces are not exceeded.

DE 11 2013 005 551 T5 discloses a display mounting system for reduced HIC (head injury criterion). This is to protect passengers in vehicles, in particular airplanes, from head injuries, e.g., in the case of sudden braking, resulting in the passengers being thrown forward. The display and therefore the display mounting system, are normally located where the head of a passenger could strike the display. To reduce the risk of injury, the display is attached to the vehicle structure via attachment means that can break at a specific point. This target breaking point allows the display to move into the vehicle structure when the structure is overloaded.

SUMMARY

Aspects of the present disclosure are directed to create a device for receiving a display/operating panel with a simple structure that can be safely incorporated in a cushioned manner in a vehicle structure.

According to some aspects, this object is achieved by a device including at least one guide that can bear on a corresponding receiver in the vehicle structure, characterized in that the guide includes both guide elements as well as deformation elements. Because a guide for the device for receiving a display/operating panel can bear on a corresponding receiver in a vehicle structure that include both guide elements and deformation elements, it is advantageously possible to construct a very compact device, and there is also no need for spring elements, thus reducing the number of overall components.

In some examples, the guide element also form the deformation element. This results in a simple, multi-functional, compact component.

The guide element also may include at least two sliding segments that are spaced apart from one another. This advantageously makes it possible to place the device in the vehicle structure such that it remains level.

The guide element also may include a honeycomb structure forming the deformation segment. As a result, the deformation segment in the form of a honeycomb structure can also be easily integrated in the guide element.

Furthermore, at least one cell in the honeycomb structure also forms a sliding segment under some aspects of the present disclosure. As a result, the distance between the sliding segments in the guide element can advantageously be relatively large, such that it can be particularly readily guided in the vehicle structure.

The vehicle structure may also contain guide rails for receiving the guide element, wherein these guide rails preferably contain a stop for the deformation segments of the guide element. This results in a particularly simple installation of the device in the vehicle structure, which also enables a defined positioning, level placement, and cushioned arrangement, in particular along the x-axis (longitudinally), of the device.

The present disclosure also relates to a motor vehicle that has a vehicle structure for receiving such a device according to the invention.

Other preferred embodiments of the invention are illustrated by the other features specified in the present disclosure.

BRIEF DESCRIPTION OF THE DRAWINGS

The present disclosure shall be described below on the basis of exemplary embodiments, in reference to the associated drawings. Therein.

DETAILED DESCRIPTION

Figure 1:
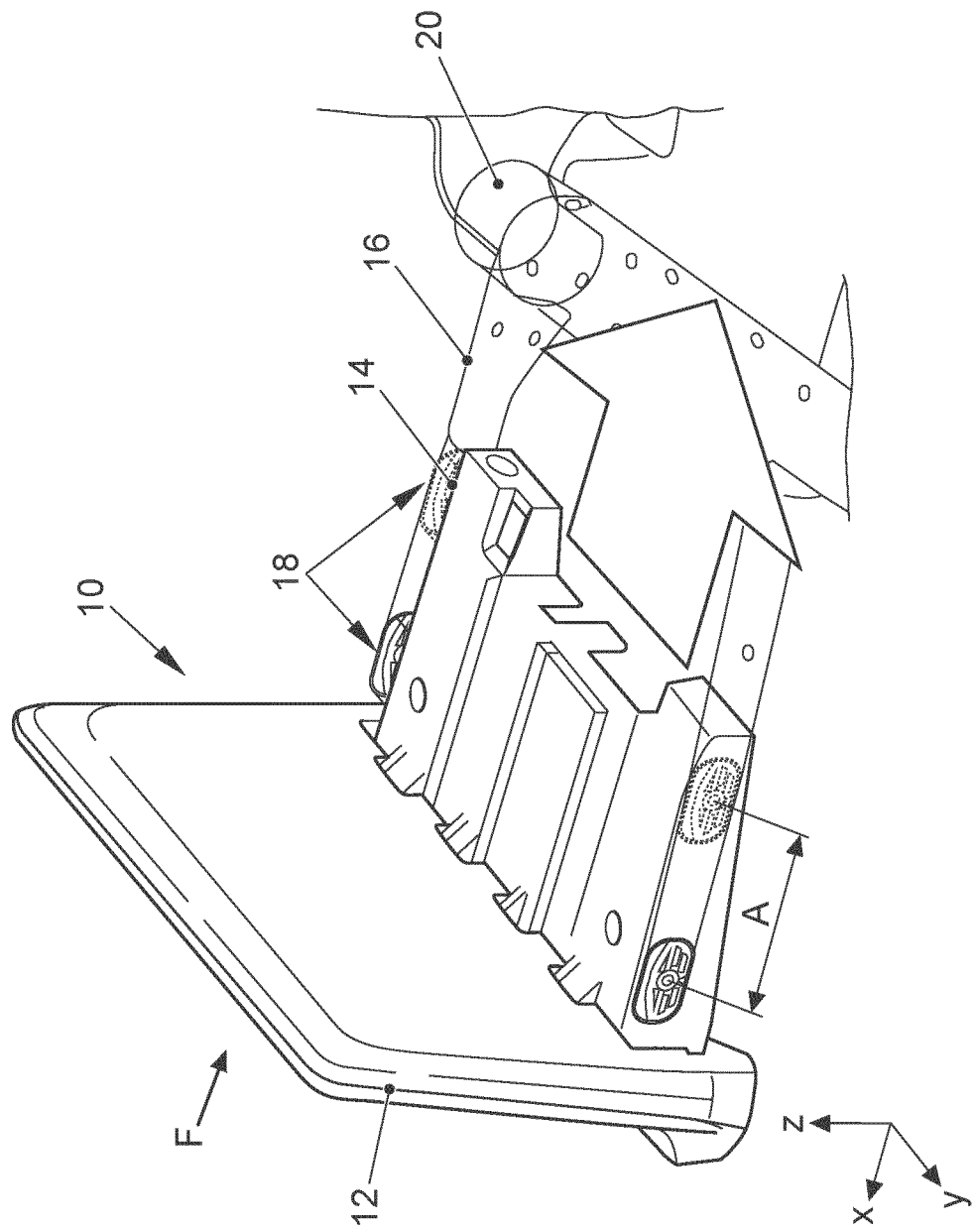
FIG. 1 shows a device for receiving a display/operating panel according to the prior art.

FIG. 1 shows a device, indicated generally with the reference numeral 10, for receiving a display/operating panel 12, which is formed by way of example by a touch-sensitive display screen. The display/operating panel 12 is connected to the device 10 by a suitable fastening means.

The device 10 also has a guide 14, by means of which the device can be positioned in a vehicle structure, not shown in FIG. 1. The vehicle structure also contains guide rails 16 for this, which are indicated in the drawing, within which the guide 14 can slide by means of sliding elements 18. The sliding elements 18 are spaced apart at a distance A. There are spring elements 10 in the vehicle structure, that the device 10 pushes against with its guide 14 when a force F is applied along the x-axis (longitudinally). The force F is applied in the event of a crash by a person's body part. The spring elements 20 allow the device 10 containing the display/operating panel 12 to give way to the force, thus minimizing the risk of injury.

FIG. 1 shows the prior art.

Figure 2:
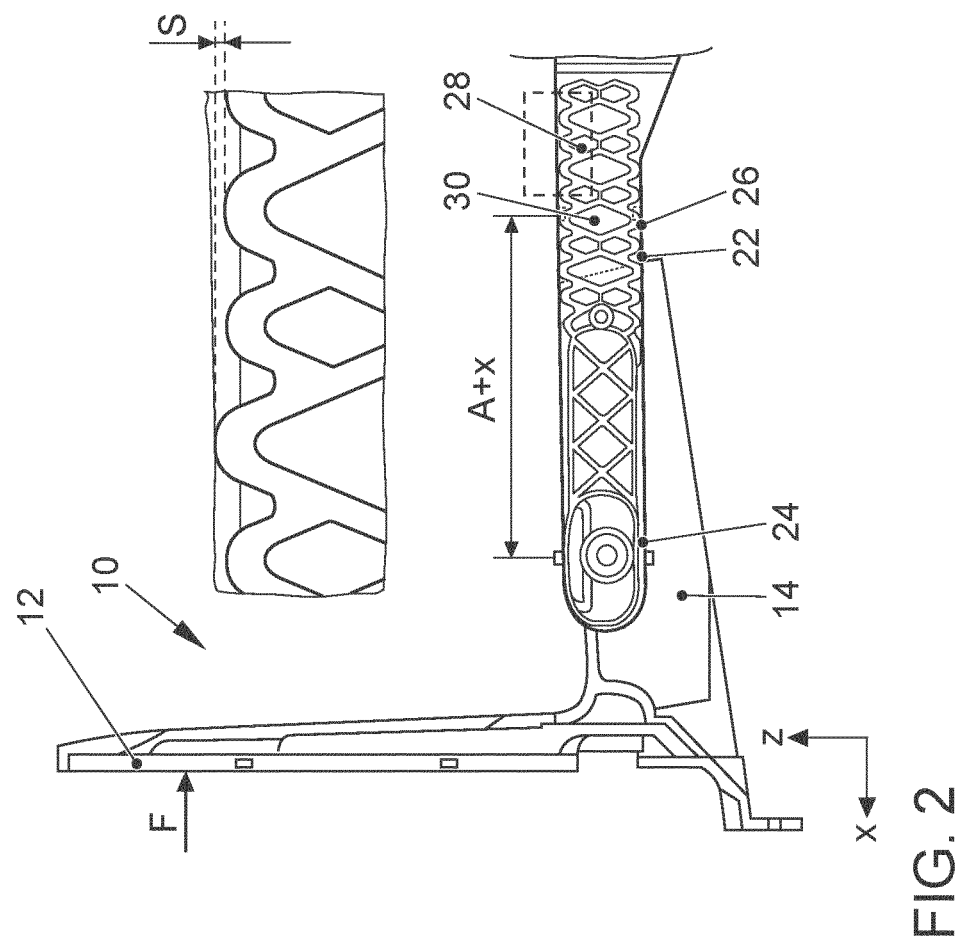
FIG. 2 shows a schematic side view of the device according to some aspects of the present disclosure.

The design of the device 10 according to the invention is illustrated in FIG. 2. Identical parts are given the same reference symbols.

The guide 14 has a guide element 22 that both guides the device in the guide rails (FIG. 1), and absorbs kinetic energy when subjected to a force F. The guide element 22 has a first sliding segment 24 and a second sliding segment 26 for this. The sliding segments 24, 26 are spaced apart (A+x) from one another. The second sliding segment 26 is formed on a honeycomb structure 28 that forms the guide elements 22. One cell 30 in the honeycomb structure 28 is larger than the other cells, such that it then forms the second sliding segment 26, which bears on the guide rails 16.

Just one guide element 22 is shown in FIG. 2. The device normally may contain at least two guide elements 22, which are spaced apart along the y-axis (laterally).

The structure and function of the guide elements 22 shall be explained in greater detail in reference to the subsequent figures.

Figure 3:
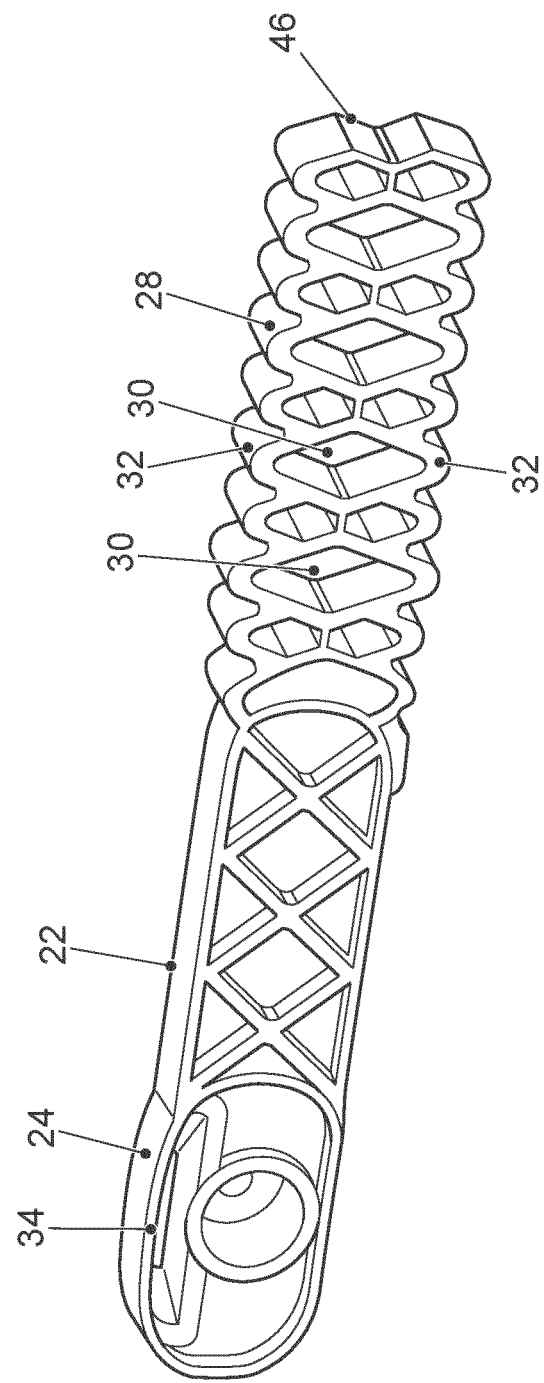
FIG. 3 shows a single guide element for the device according to some aspects of the present disclosure.

The guide element 22 is shown in a perspective view in FIG. 3. The honeycomb structure 28 containing the larger cells 30, which are vertically larger than two of the other cells in the honeycomb structure 28, can be clearly seen in the honeycomb structure 28, which form the sliding segment 26 of the guide element 22 with their outer contact surfaces 32.

In another example, there can be one or more of these enlarged cells 30.

The guide element 22 also comprises the sliding segment 24 formed by an elastically supported wall section 34 of the guide element 22.

The guide element 22 is connected in a suitable manner to the guide 14 in the device 10. The guide 14 is inserted into the guide rails 16 (FIG. 1), such that the contact surfaces 32 and the wall section 34 bear on the upper delimitation of the guide rail 16. Because of the inherent elasticity of the wall section 34 and the contact surface 32, this bearing contact is tensioned. This tension can be adjusted by the selection of the material and size of the guide elements 22.

Figure 4:
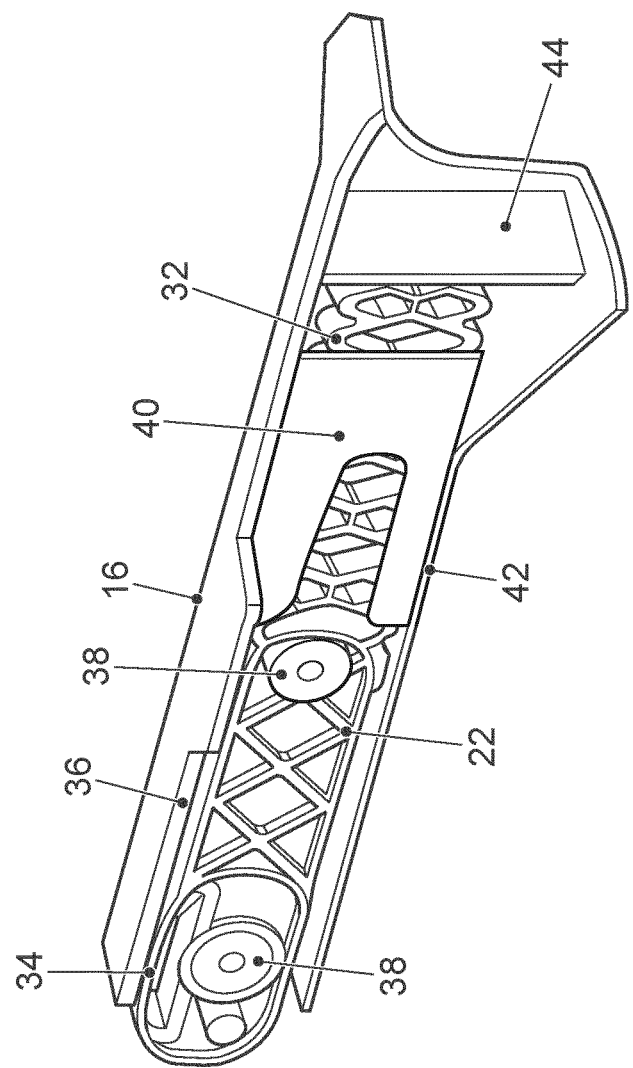
FIG. 4 shows a guide element in a rail according to some aspects of the present disclosure.

FIG. 4 shows a schematic perspective view of the placement of a guide element 22 in a guide rail 16. In this example, it can be seen therein how an upper delimitation 36 of the guide rail 16 bears on the wall section 34 and the contact surface 32. The guide 14 in the device 10 that ultimately receives the display/operating panel, is connected thereto via fastening points 38 indicated herein. The connection is obtained via additional fasteners, latching connections, or some other means, not shown herein.

FIG. 4 shows, furthermore, that the guide rails 16 have a dedicated guide plate 40. This guide plate 40 secures the guide element 22 along the y-axis (laterally). The upper end 36 and the corresponding lower section 42 of the guide rail 16 secure the guide element 22 along the z-axis (vertically).

The guide rail 16 also forms a stop 44, which bears on an end section 46 (FIG. 3) of the guide element 22.

In addition to the guidance of the device 10 in the vehicle structure via the guide elements 22 and the corresponding guide rails 16, the guide element 22 also assumes the function of a deformation element. This shall be explained in reference to FIG. 5.

Figure 5:
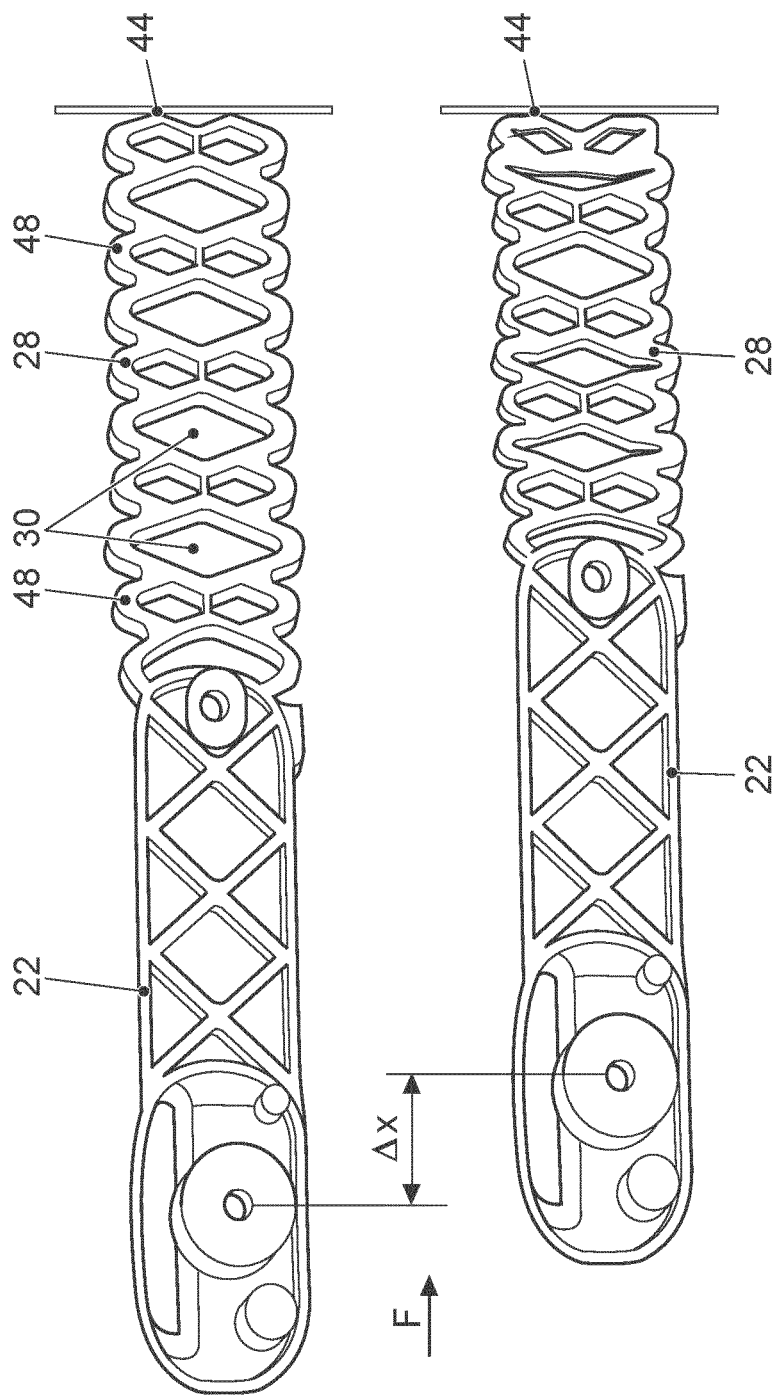
FIG. 5 shows how the guide element can be deformed according to some aspects of the present disclosure.

The upper illustration in the example of FIG. 5 shows the guide element 22 in its normal operating form, and the lower illustration in FIG. 5 shows the guide element 22 when it has been deformed. The stop 44 in the guide rails 16 is also indicated. The guide rails 16 are permanently integrated in the vehicle structure, thus defining a stop position for the guide elements 22.

The honeycomb structure 28 of the guide element 22 is illustrated in the upper illustration in FIG. 5. Smaller cells 48 are formed in pairs between the larger cells 30, which guide the guide elements 22 in the guide rails 16, as explained above. The cells 30 and 48 are preferably symmetrical to one another. This means that the each have, e.g., the same opening angle of 130° and a wall thickness of, e.g., 1.6 mm.

If the guide element 22 is then pressed against the stop 44 by a force F along the x-axis, the cells 30 and 48 become deformed. The guide element 22 can be displaced a distance of $\Delta x$ into the vehicle structure, i.e., against the stationary stop 44.

The cells 30 and 48 become deformed in the elastic regions and convert the energy of the movement into deformation energy as a function of the value for $\Delta x$.

Depending on the structural design of the honeycomb structure 28, such as the wall thicknesses of the cells 30 and 48, or the opening angles of the cells 30 and 48, parameters can be adjusted with which a force F enables a deformation of $\Delta x$.

The guide element 22 results on the whole in a multi-functional, compact component, which allows for an individual force/distance curve. Because of the integral production, there is no need for additional elements for the guidance and the deformation along the x-axis.

LIST OF REFERENCE SYMBOLS 10 device
12 display/operating panel
14 guide
16 guide rails
18 sliding elements
20 spring elements
22 guide element
24 first sliding segment
26 second sliding segment
28 honeycomb structure
30 cells
32 outer contact surface
34 wall section
36 upper section/delimitation/end
38 fastening point
40 guide plate
42 lower section
44 stop
46 end section
48 small cells
A spacing
F force

The invention claimed is:

1. A device for receiving a display/operating panel in a vehicle structure, comprising:
    at least one guide, configured to bear on a corresponding receiver in the vehicle structure, wherein the guide comprises guide elements and a honeycomb structure integrated into the at least one guide, wherein the honeycomb structure is configured to deform along the x-axis to absorb crash-induced kinetic energy, thereby functioning as a deformation segment,
    and wherein at least one cell in the honeycomb structure is configured as a sliding segment.

2. The device of claim 1, wherein the guide comprises at least two sliding segments spaced at a predetermined distance from each other.

3. The device of claim 1, further comprising cells formed between other cells in the honeycomb structure.

4. The device of claim 3, wherein each cell in the honeycomb structure has an opening angle of 130°, measured at the center of the cell.

5. The device of claim 1, further comprising guide rails configured within the vehicle structure for receiving the guide elements.

6. The device of claim 5, wherein the guide rails are configured to form a stop for the deformation segment of the guide elements.

7. The device of claim 1, wherein the guide element comprises an elastically supported wall section forming at least one of the sliding segments, the elastically supported wall section configured to provide elastic support along a z-axis of the vehicle structure.

8. The device of claim 1, wherein the guide element is configured to bear on the corresponding receiver with a tensioned contact, the tensioned contact being adjustable by a material selection of the guide element.

9. The device of claim 8, wherein the tensioned contact is provided by an outer contact surface of the at least one cell configured as the sliding segment and the elastically supported wall section.

10. A method for forming a device for receiving a display/operating panel in a vehicle structure, comprising:
    forming at least one guide, configured to bear on a corresponding receiver in the vehicle structure, wherein the guide comprises guide elements and deformation elements integrated on the at least one guide, wherein forming the guide comprises forming a honeycomb structure, configured to deform along the x-axis to absorb crash-induced kinetic energy, thereby functioning as a deformation segment, wherein forming the guide comprises forming at least one cell in the honeycomb structure, configured as a sliding segment.

11. The method of claim 10, wherein forming the guide comprises forming at least two sliding segments spaced at a predetermined distance from each other.

12. The method of claim 10, wherein forming the guide comprises forming cells between other cells in the honeycomb structure.

13. The method of claim 12, wherein forming the guide comprises forming each cell in the honeycomb structure to have an opening angle of 130°, measured at the center of the cell.

14. The method of claim 10, further comprising forming guide rails configured within the vehicle structure for receiving the guide elements.

15. The method of claim 14, wherein forming the guide rails comprises forming the guide rails to form a stop for the deformation segment of the guide elements.

16. The method of claim 10, wherein forming the guide comprises forming the guide element with an elastically supported wall section forming at least one of the sliding segments, the elastically supported wall section configured to provide elastic support along a z-axis of the vehicle structure.

17. The method of claim 10, wherein forming the guide comprises configuring the guide element to bear on the corresponding receiver with a tensioned contact, the tensioned contact being adjustable by a material selection of the guide element.

18. A device for receiving a display/operating panel in a vehicle structure, comprising:
    at least one guide, configured to bear on a corresponding receiver in the vehicle structure, wherein the guide comprises guide elements and a honeycomb structure integrated into the at least one guide,
    wherein the honeycomb structure being configured as a deformation segment, and wherein at least one cell in the honeycomb structure is configured as a sliding segment.

19. The device of claim 18, wherein the guide comprises at least two sliding segments spaced at a predetermined distance from each other.

20. The device of claim 18, further comprising cells formed between other cells in the honeycomb structure.

* * * * *